United States Patent
De Almeida

(10) Patent No.: US 10,661,480 B2
(45) Date of Patent: May 26, 2020

(54) PREFORM MOLDING SYSTEM AND MOLD STACK FOR A PREFORM MOLDING SYSTEM

(71) Applicant: Mold-Masters (2007) Limited, Georgetown (CA)

(72) Inventor: Richard De Almeida, Mississauga (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 253 days.

(21) Appl. No.: 15/525,167

(22) PCT Filed: Nov. 6, 2015

(86) PCT No.: PCT/CA2015/051152
§ 371 (c)(1),
(2) Date: May 8, 2017

(87) PCT Pub. No.: WO2016/070287
PCT Pub. Date: May 12, 2016

(65) Prior Publication Data
US 2017/0334093 A1    Nov. 23, 2017

Related U.S. Application Data

(60) Provisional application No. 62/076,544, filed on Nov. 7, 2014.

(51) Int. Cl.
*B29C 45/33*    (2006.01)
*B29B 11/08*    (2006.01)
(Continued)

(52) U.S. Cl.
CPC ............ *B29B 11/08* (2013.01); *B29C 33/444* (2013.01); *B29C 45/0055* (2013.01);
(Continued)

(58) Field of Classification Search
CPC ... B29C 33/444; B29C 45/0055; B29C 45/33; B29C 45/44; B29C 45/407; B29C 2045/4078
See application file for complete search history.

(56) References Cited

U.S. PATENT DOCUMENTS

| | | | |
|---|---|---|---|
| 4,564,113 A | 1/1986 | Mendler | |
| 5,114,655 A | 5/1992 | Cole | |

(Continued)

FOREIGN PATENT DOCUMENTS

| | | |
|---|---|---|
| DE | 28 14 952 A1 | 10/1978 |
| EP | 1 647 389 A1 | 4/2006 |

(Continued)

OTHER PUBLICATIONS

International Search Report, issued in International Application No. PCT/CA2015/051152, dated Jan. 19, 2016.

(Continued)

*Primary Examiner* — Christina A Johnson
*Assistant Examiner* — Xue H Liu
(74) *Attorney, Agent, or Firm* — Medler Ferro Woodhouse & Mills PLLC

(57) ABSTRACT

A preform molding system is disclosed that includes a cavity half that is mountable to a stationary platen of an injection molding machine and a core half that is mountable to a moving platen of the injection molding machine. The preform molding system includes a mold stack assembly having a cavity portion and a core portion. The cavity portion is coupled to the cavity half and includes a cavity insert, and the core portion is coupled to the core half and includes a core insert, a pair of neck rings, and a stripper ring. The core insert has an undercut that defines an annular protrusion on an internal surface of a preform that is created in the mold stack assembly. The preform molding system is configured (Continued)

to permit in sequence, retraction of the pair of neck rings away from the core insert and ejection of the preform from the core insert via the stripper ring.

17 Claims, 10 Drawing Sheets

(51) Int. Cl.
*B29C 45/44* (2006.01)
*B29C 33/44* (2006.01)
*B29C 45/00* (2006.01)
B29K 105/00 (2006.01)
B29C 45/40 (2006.01)

(52) U.S. Cl.
CPC .............. *B29C 45/33* (2013.01); *B29C 45/44* (2013.01); *B29C 45/4407* (2013.01); *B29B 2911/1402* (2013.01); *B29B 2911/1404* (2013.01); *B29B 2911/14026* (2013.01); *B29B 2911/14033* (2013.01); *B29B 2911/14328* (2015.05); *B29B 2911/14335* (2015.05); *B29B 2911/14413* (2013.01); *B29C 2045/4078* (2013.01); *B29K 2105/258* (2013.01)

(56) References Cited

U.S. PATENT DOCUMENTS

| | | |
|---|---|---|
| 5,232,718 A | 8/1993 | Miyazawa et al. |
| 5,340,304 A | 8/1994 | Nakamura |
| 6,068,811 A | 5/2000 | Koda |
| 6,887,418 B2 | 5/2005 | Olaru et al. |
| 6,989,124 B2 | 1/2006 | Miller et al. |
| 7,540,740 B2 | 6/2009 | Hofstetter et al. |
| 8,376,732 B2 | 2/2013 | Mccready |
| 2012/0211458 A1 | 8/2012 | Patel et al. |
| 2012/0219651 A1 | 8/2012 | Weber et al. |
| 2012/0241457 A1 | 9/2012 | Hallman et al. |
| 2013/0082074 A1 | 4/2013 | Armstrong et al. |
| 2013/0243897 A1 | 9/2013 | McCready et al. |
| 2014/0319731 A1 | 10/2014 | Moore |

FOREIGN PATENT DOCUMENTS

| | | |
|---|---|---|
| EP | 1 676 689 A1 | 7/2006 |
| JP | S62-156923 A | 7/1987 |
| JP | H06-134756 A | 5/1994 |
| WO | 2010/017622 | 2/2010 |

OTHER PUBLICATIONS

Designing for Moldability, $2^{nd}$ Ed., Proto Labs, 2010.
Extended European Search Report dated Jun. 13, 2018 in corresponding European Patent Application No. 15 857 633.0.

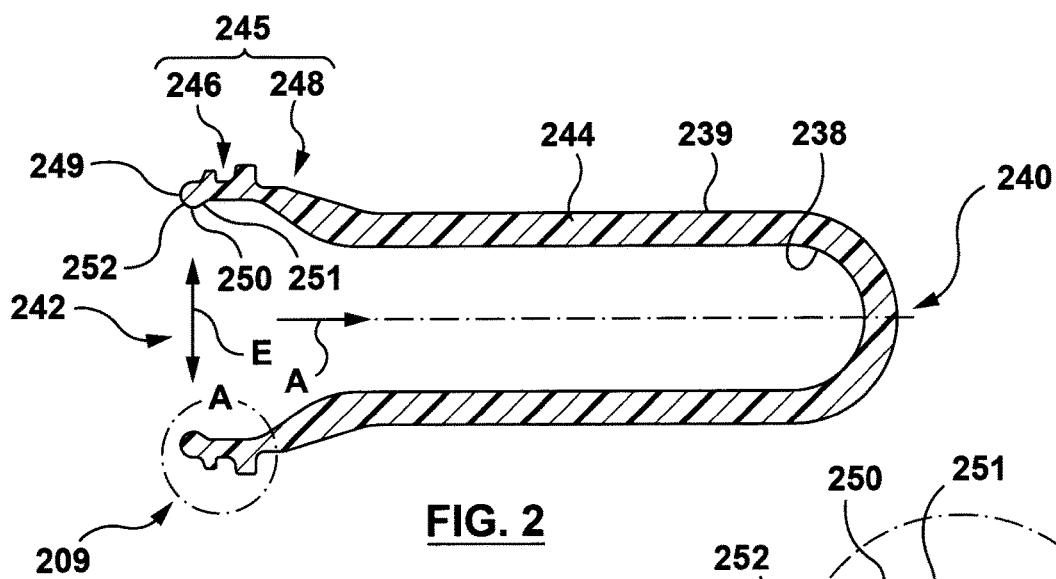
FIG. 2
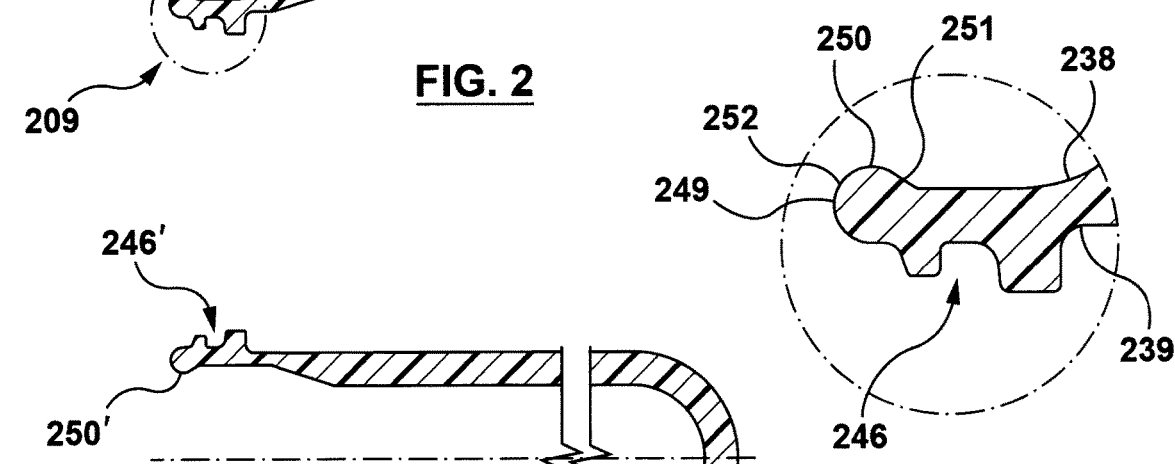
FIG. 2A
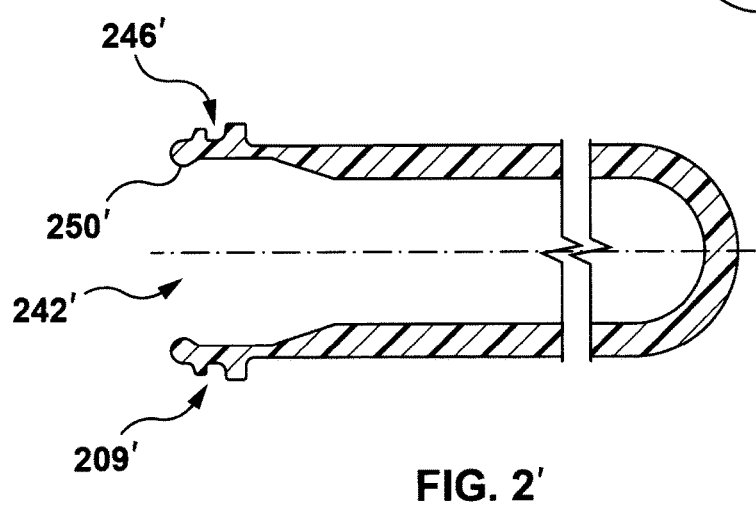
FIG. 2'
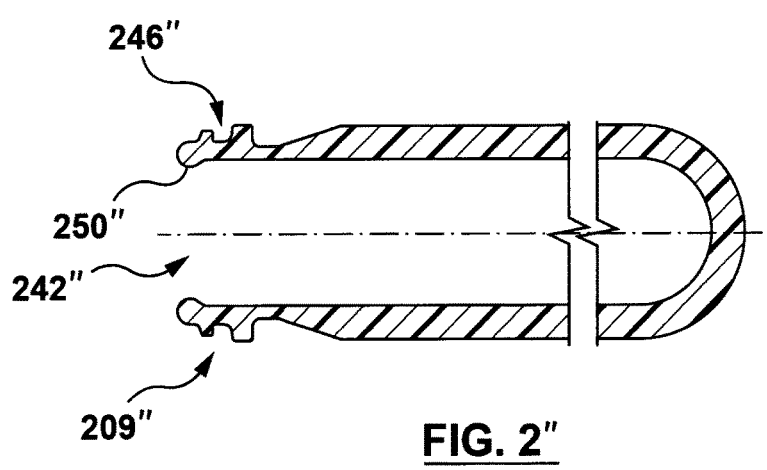
FIG. 2"

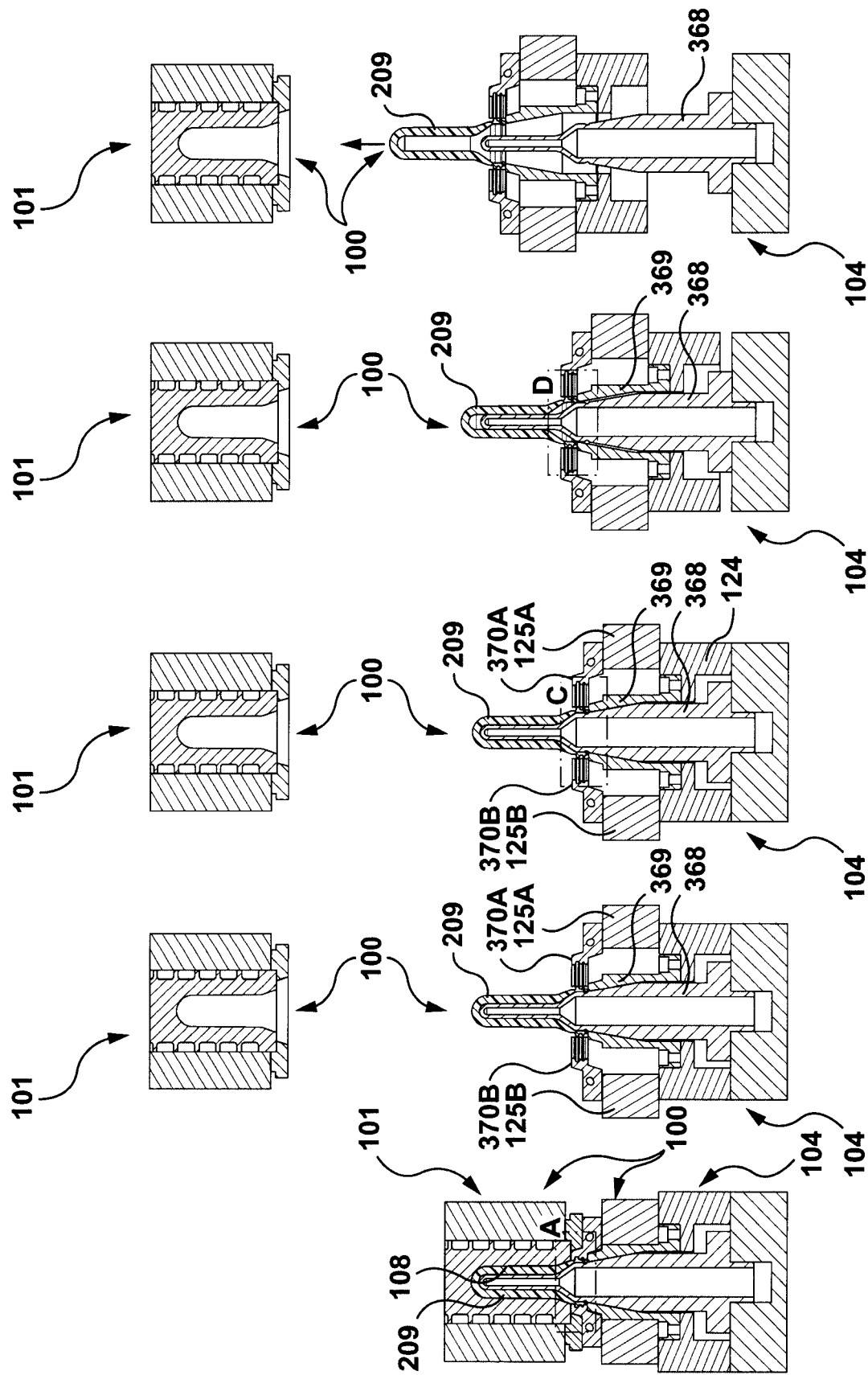

PREFORM MOLDING SYSTEM AND MOLD STACK FOR A PREFORM MOLDING SYSTEM

FIELD OF THE INVENTION

The invention relates to preform injection molding systems and more specifically to a mold stack for a preform injection molding system.

BACKGROUND OF THE INVENTION

Injection molding is a process by which raw polymeric pellets, also referred to as a molding material, are transformed into molded articles by heating the molding material to a molten state and forcing it under pressure into a mold cavity. A subset of injection molding is the molding of preforms, which are intermediate articles that are shaped into final articles, for example, beverage containers, by blow molding, and thereafter the final article may be fitted with a closure to contain a substance therein.

SUMMARY OF THE INVENTION

Embodiments hereof are directed towards a preform molding system having a cavity half that is mountable to a stationary platen of an injection molding machine and a core half that is mountable to a moving platen of the injection molding machine. The preform molding system includes a mold stack assembly having a cavity portion and a core portion. The cavity portion is coupled to the cavity half and includes a cavity insert, and the core portion is coupled to the core half and includes a core insert, a pair of neck rings, and a stripper ring. The core insert has an undercut that defines an annular protrusion on an internal surface of a preform that is created in the mold stack assembly. The preform molding system is configured to permit in sequence, retraction of the pair of neck rings away from the core insert, and ejection of the preform from the core insert via the stripper ring.

Embodiments hereof are also directed towards a method of ejecting a preform from a preform molding system, the method includes separating a core half and a cavity half of the preform molding system and retracting a pair of neck rings from the preform; axially displacing the preform relative to a core insert to cause an open end of the preform to expand around a calibration portion of the core insert, and maintaining the open end of the preform in an expanded state while continuing to axially displace the preform from the mold.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2 is a sectional view of a preform molded in the preform molding system of FIGS. 1, 1A, and 1B.

FIG. 2A is an enlarged view of a portion A of FIG. 2.

FIG. 2' is a sectional view of a straight-wall preform molded in a preform molding system in accordance with an embodiment hereof.

FIG. 2" is a sectional view of a reverse-taper preform molded in a preform molding system in accordance with an embodiment hereof.

FIGS. 4A-4E are sequential sectional views depicting part removal of a preform molded in accordance with an embodiment hereof.

FIG. 4AA is an enlarged view of a portion A of FIG. 4A.

FIG. 4CC is an enlarged view of a portion C of FIG. 4C.

FIG. 4DD is an enlarged view of a portion D of FIG. 4D.

DETAILED DESCRIPTION OF THE DRAWINGS

Specific embodiments of the present invention are now described with reference to the figures, wherein like reference numbers indicate identical or functionally similar elements. In the following description, "downstream" is used with reference to the general flow of molding material as a mold cavity is filled and also to the order of components, or features thereof, through which the molding material flows as the mold cavity is filled, whereas "upstream" is used with reference to the opposite direction. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
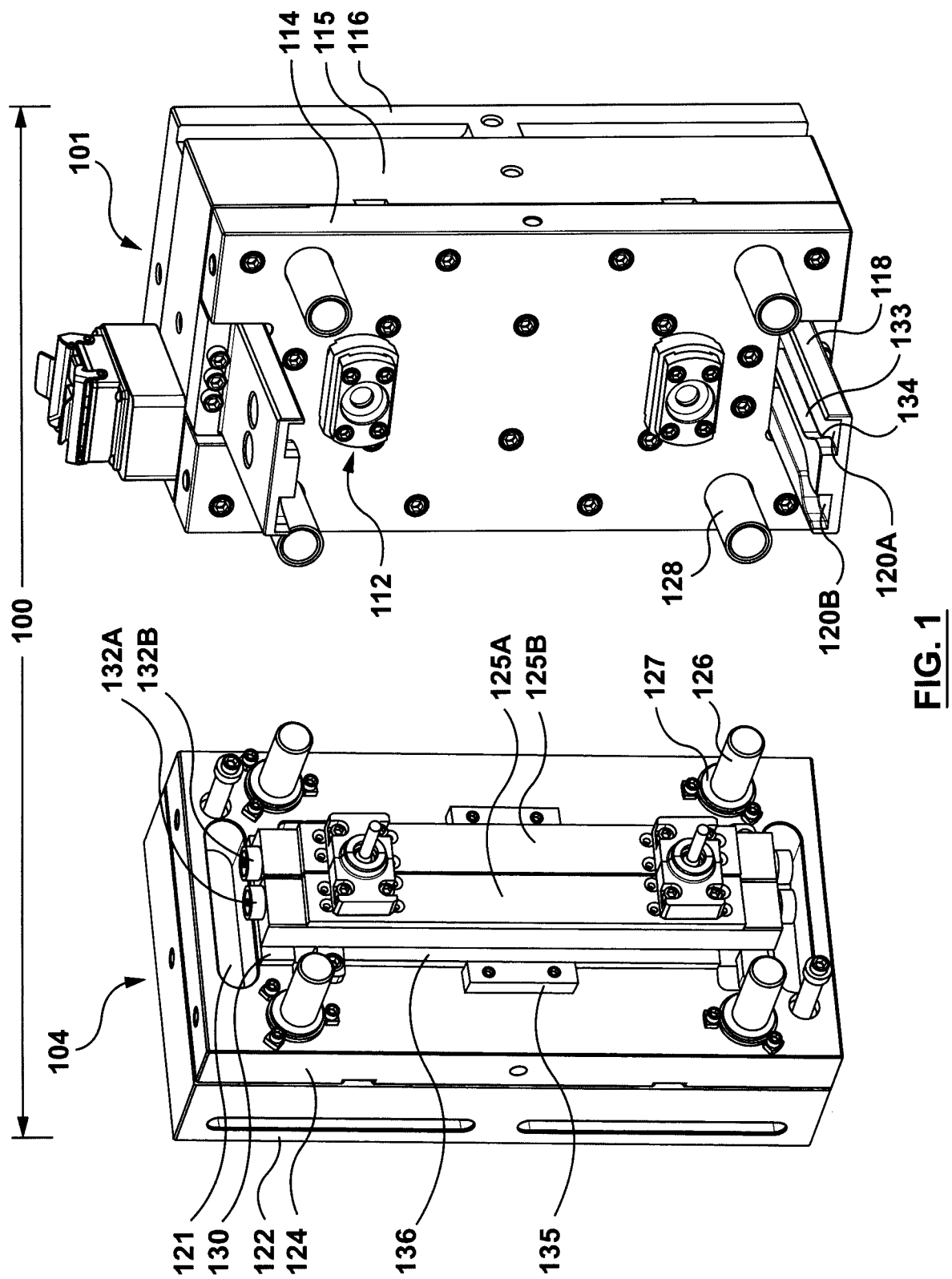
FIG. 1 is a perspective view of a preform molding system in accordance with an embodiment hereof.
Figure 1A:
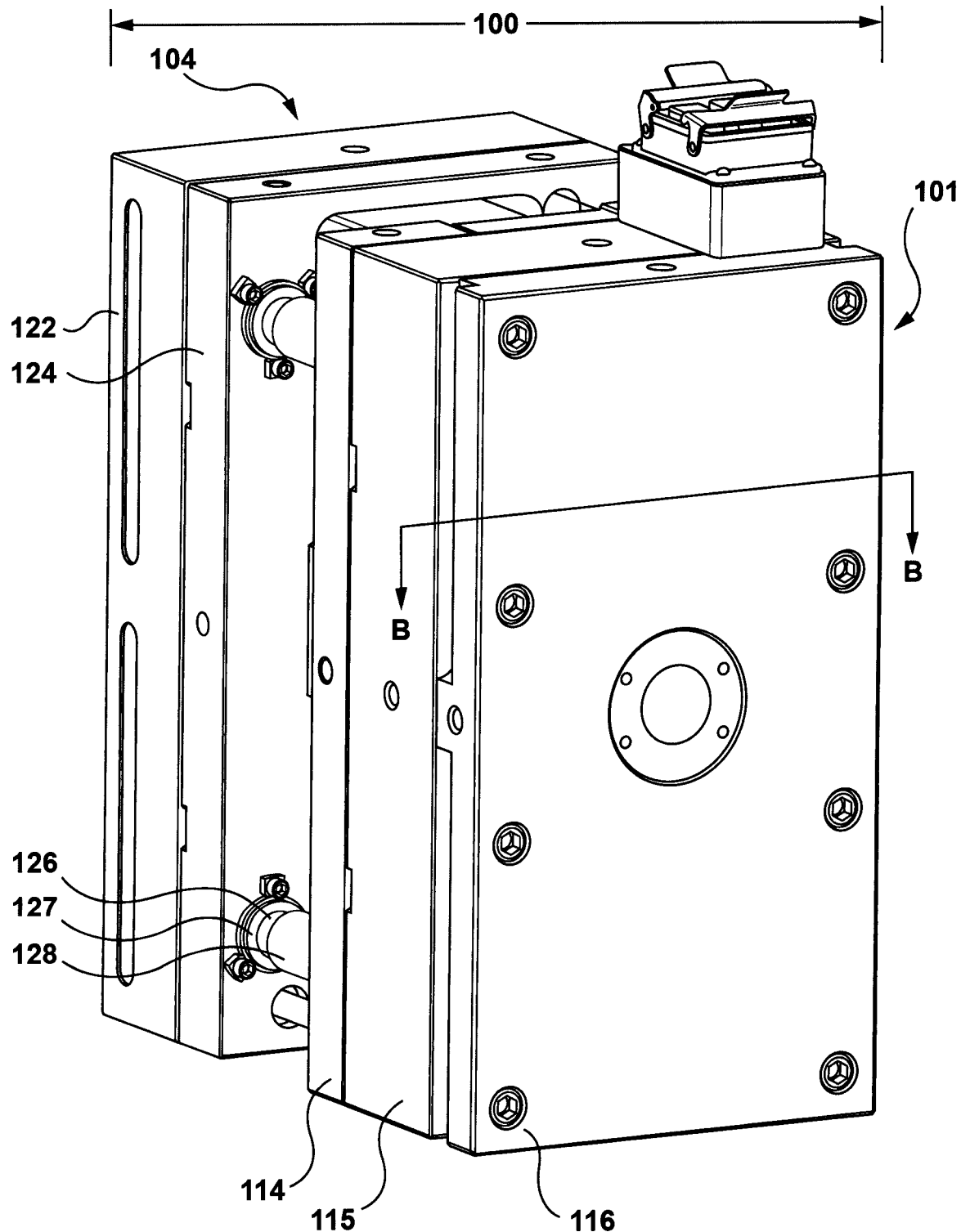
FIG. 1A is the preform molding system of FIG. 1 in a mold closed configuration.
Figure 1B:
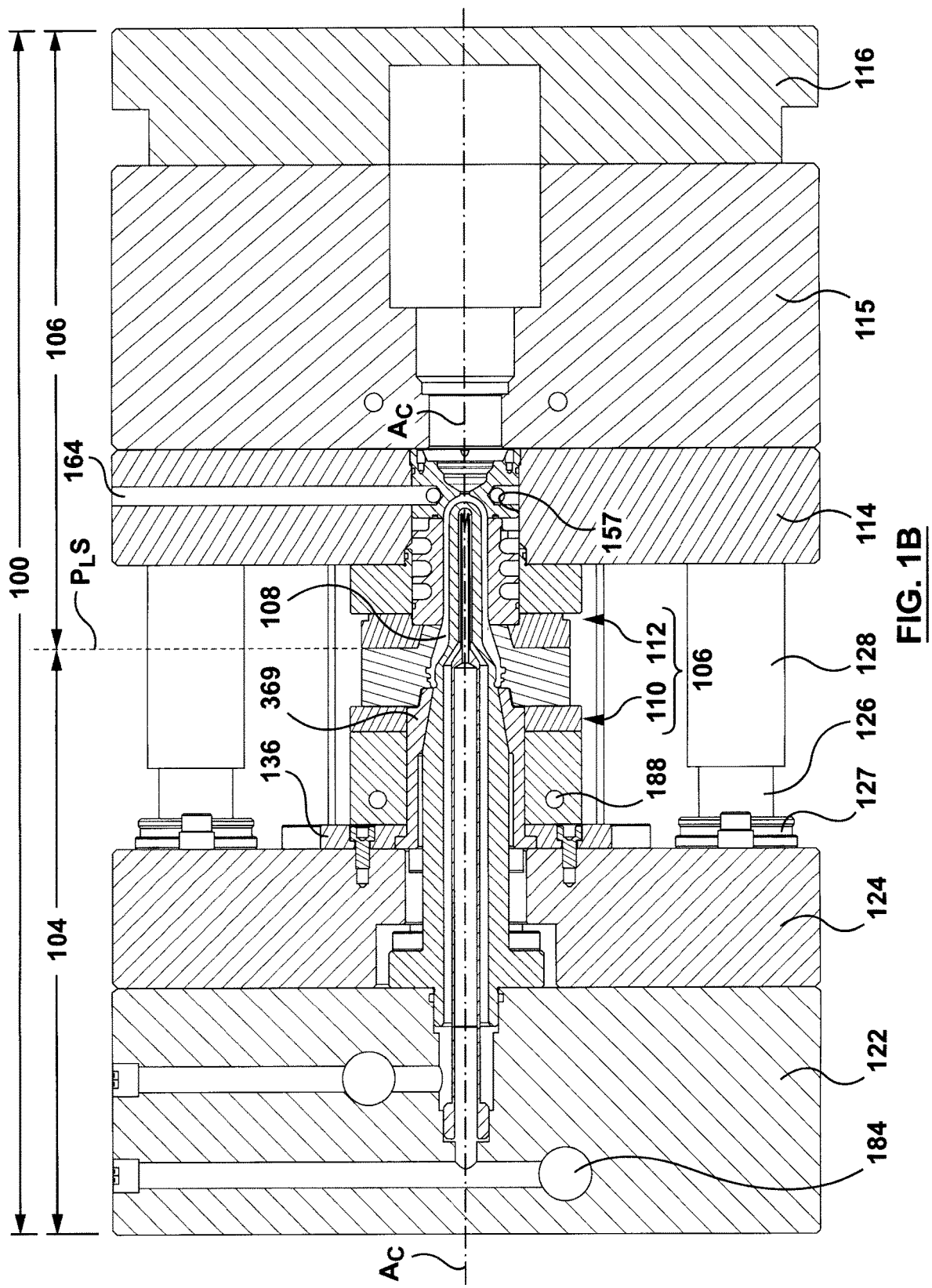
FIG. 1B is a sectional view of FIG. 1A taken through line B-B.

Referring now to FIGS. 1, 1A, and 1B in which FIG. 1 is a perspective view of a preform molding system 100 in accordance with an embodiment hereof that is in an open configuration and rotated for ease of viewing, features and aspects of the current embodiment can be used accordingly with the other embodiments; FIG. 1A is the preform molding system 100 of FIG. 1 in a mold closed configuration; and FIG. 1B is a sectional view of FIG. 1A taken along line B-B. Preform molding system 100 generally includes a cavity half 101 and a core half 104, and is configured for mounting between the platens of an injection molding machine (not shown). In operation, cavity half 101 is coupled to the stationary platen of the injection molding machine and core half 104 is coupled to the moving platen of the injection molding machine. Cavity half 101 and core half 104 are configured to receive a mold stack assembly 106, shown in FIG. 1B, which defines a mold cavity 108 that conforms to the shape of a preform 209 (shown in FIG. 2) created in preform molding system 100. Continuing with FIG. 1B, mold stack assembly 106 is concentric about a central axis $A_C$, and can be generally divided into a core portion 110 associated with core half 104, and a cavity portion 112 associated with cavity half 101. Core half 104 and cavity half 101, and their respective core and cavity portions 110, 112 of mold stack assembly 106 are separable along mold stack parting line $P_LS$ for removal or ejection of preform 209 from preform molding system 100. As depicted in the embodiments disclosed herein, preform molding system 100 has two mold stacks by way of example and not limitation.

Continuing with FIGS. 1, 1A, and 1B, cavity half 101 includes inter alia a cavity plate 114 a manifold plate 115, a cavity clamp plate 116, and cavity portion 112 of mold stack assembly 106. In operation, cavity half 101 is coupled to the stationary platen of the injection molding machine via cavity clamp plate 116. Together, cavity clamp plate 116, manifold plate 115, and cavity plate 114 define a pocket in which a hot runner system (not shown) is received. As shown in FIG. 1, in the current embodiment, cavity half 101 further includes a cam plate 118 that defines a pair of cam tracks 120A, 120B. Cam plate 118 extends towards core half 104 to engage therewith as will be discussed in further detail below. A recess 121 is provided in core half 104 to accommodate a portion of cam plate 118 that projects into core half 104 when preform molding system 100 is in a mold closed configuration.

As is typical, the hot runner system includes inter alia a manifold and a nozzle which together define a melt channel through which molding material travels from the injection molding machine to mold cavity 108. In operation the hot runner system is maintained at a temperature suitable for processing the molding material from which preform 209 is made, a common example of which includes polyethylene terephthalate (PET).

Core half 104 includes inter alia a core clamp plate 122, a stripper plate 124 and lateral slides 125A, 125B. In operation, core half 104 is coupled to the moving platen of the injection molding machine via core clamp plate 122. A guide pin 126 is secured to core clamp plate 122 and extends through a stripper bushing 127 that is retained in stripper plate 124. When preform molding system 100 is in a mold closed configuration, such as depicted in FIG. 1A and FIG. 1B, guide pin 126 extends across mold stack parting line $P_LS$ and is received in a guide bushing 128 in cavity plate 114. Together, guide pin 126 and stripper bushing 127 guide the movement of stripper plate 124 in a direction parallel to central axis $A_C$ when stripper plate 124 is actuated, and engagement between guide pin 126 and guide bushing 128 assists in aligning core half 104 with cavity half 101 as preform molding system 100 is closed. In operation, a knockout rod (not shown) or other connector extends through an opening (not shown) in core clamp plate 122 to couple stripper plate 124 with a stripper plate actuator (not shown), an example of which includes an ejector system of the injection molding machine.

As shown in FIG. 1, lateral slides 125A, 125B are slidably coupled to stripper plate 124 via gibs 130 (partially shown in FIG. 1), and are configured to move in outward or transverse relative to the actuation direction of stripper plate 124, i.e. perpendicular to central axis $A_C$. Cam followers 132A, 132B are coupled to respective lateral slides 125A, 125B to engage with a respective cam track 120A, 120B in cam plate 118. Cam tracks 120A, 120B includes an inactive portion 133 that is aligned with central axis $A_C$, and an active portion 134 that continues from inactive portion 133 towards core half 104, and extends outward at an angle relative to central axis $A_C$. Since cam plate 118 is coupled to cavity half 101, and lateral slides 125A, 125B are coupled to core half 104, as core half 104 and cavity half 102 are separated, for example, when preform molding system 100 is opened by the injection molding machine during a molding cycle, cam followers 132A, 132B follows the pathway defined by respective cam tracks 120A, 120B. For example, as preform molding system is opened lateral slides 125A, 125B initially remain together while each cam follower 132A, 132B is guided by a respective inactive portion 133. Beyond inactive portion 133 each cam follower 132A 132B is guided by a respective active portion 134, which is configured to translate mold opening movement into sideways or outward movement of lateral slides 125A, 125B, which separates lateral slides 125A, 125B. Conversely, when preform molding system 100 is closed by the injection molding machine, for example between successive molding cycles, cam followers 132A, 132B follow the respective pathways defined by cam tracks 120A, 120B in the reverse direction to close lateral slides 125A, 125B. The angle selected for active portion 134 determines the amount of sideways movement of lateral slides 125A, 125B for each unit of mold opening/closing movement. In the current embodiment cam followers 132A, 132B disengage from cam tracks 125A, 125B when preform molding system 100 is opened to eject a preform 209. In order to maintain alignment between cam followers 132A, 132B and respective cam tracks 120A, 120B when preform molding system is opened, stripper plate 124 includes a pair of stops, such as stop 135, which prohibits movement of respective lateral slides 125A, 125B.

A wear plate 136 is disposed between lateral slides 125A, 125B and stripper plate 124 to provide a replaceable wear surface upon which lateral slides travel during operation. In an embodiment, wear plate 136 is made from brass or a brass alloy to provide this function.

Referring now to FIG. 2 and to FIG. 2A, in which FIG. 2 is a sectional view of preform 209 that is molded in preform molding system 100, and FIG. 2A is an enlarged view of a portion A of FIG. 2. Preform 209 is generally test-tube shaped, and has an internal surface 238 and an external surface 239. Preform 209 has a base or closed end 240 and a mouth or open end 242, and has a body portion 244 and a neck portion 245 extending therebetween. Neck portion 245 includes a finish portion 246 and a tapered portion 248 which tapers outward in the downstream direction to create a transition between finish portion 246 and body portion 244. Preform 209 is known as a so-called bell-mouth preform. Finish portion 246 further includes a top sealing surface 249 at open end 242. Finish portion 246 typically includes features that retain their injection molded size and shape after preform 209 is converted, for example, by blow molding into a bottle or other container. Examples of such features include a support ring and closure engaging features, among others. In accordance with embodiments hereof, finish portion 246 includes an annular protrusion 250 on the inside of preform 209 that includes a concave portion 251 and a convex portion 252, which in the current embodiment create a transition between internal surface 238 and top sealing surface 249. Internal protrusion 250 is configured to mate with a closure, for example a metal roll-formed closure (not shown) having complementary shaped geometry on an external circumferential surface thereof so as to facilitate an interference fit between preform 209, more specifically protrusion 250, and the closure. This sort of preform/closure arrangement can in some instances allow preform 209 to be used in pressure vessel applications where a typical externally thread preform and internally threaded closure may prove to be unsatisfactory, nonlimiting examples of which may include aerosol applications and certain carbonated beverages.

Although as shown in the embodiments disclosed herein, preform molding system 100 and mold stack assembly 106 are configured to form a bell-mouth preform, this is by way of example and not limitation. It should be noted that the finish portion geometry, including protrusion 250 could also be used in mold stack assemblies that are configure to create other preform types.

For example, in FIG. 2' a so-called straight-walled preform 209' is shown which has a finish portion 246' that includes an internal protrusion 250' at an open end 242' thereof. In another example, in FIG. 2' a so-called reverse-taper preform 209" is shown which has a finish portion 246" that includes an internal protrusion 250" at an open end 242" thereof.

Figure 3:
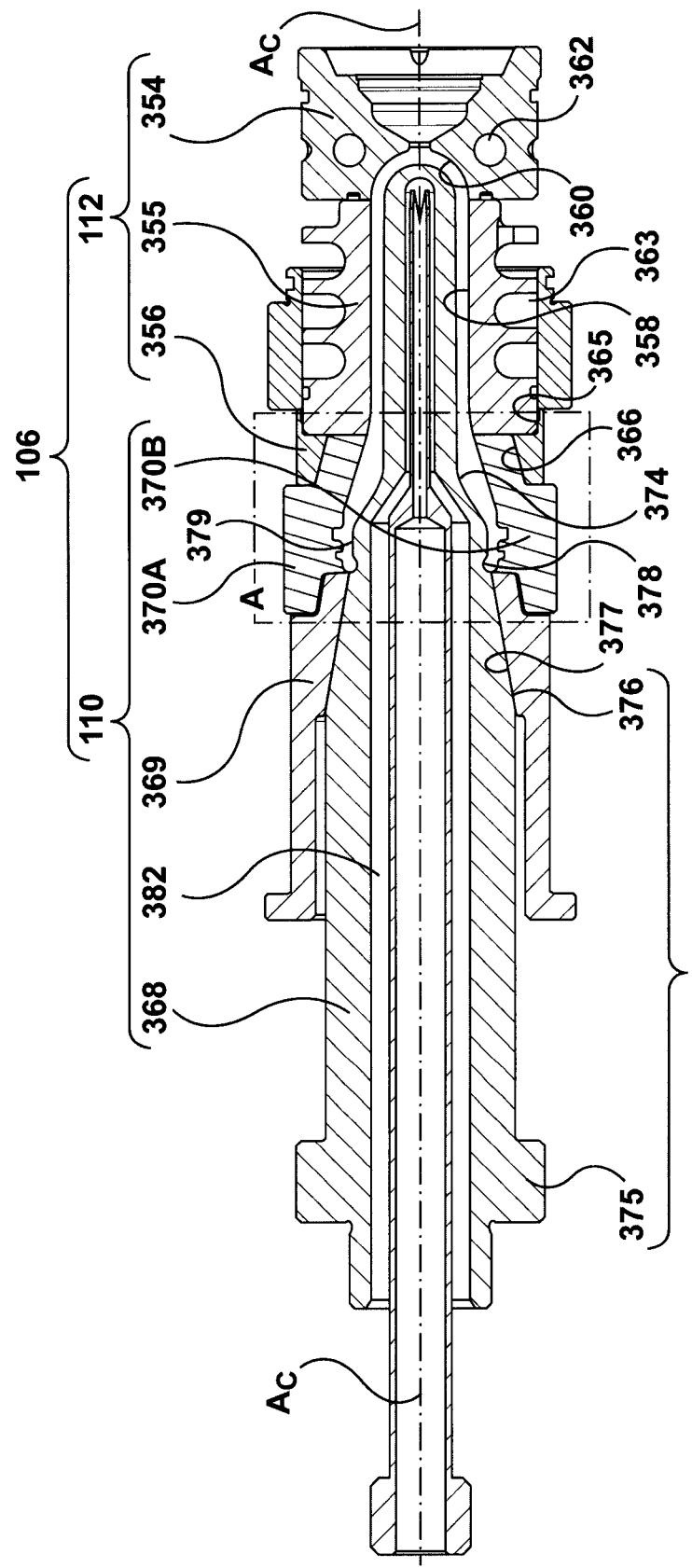
FIG. 3 is an enlarged view of a mold stack in accordance with an embodiment hereof shown in a plane that is perpendicular to that shown in FIG. 1B.
Figure 3A:
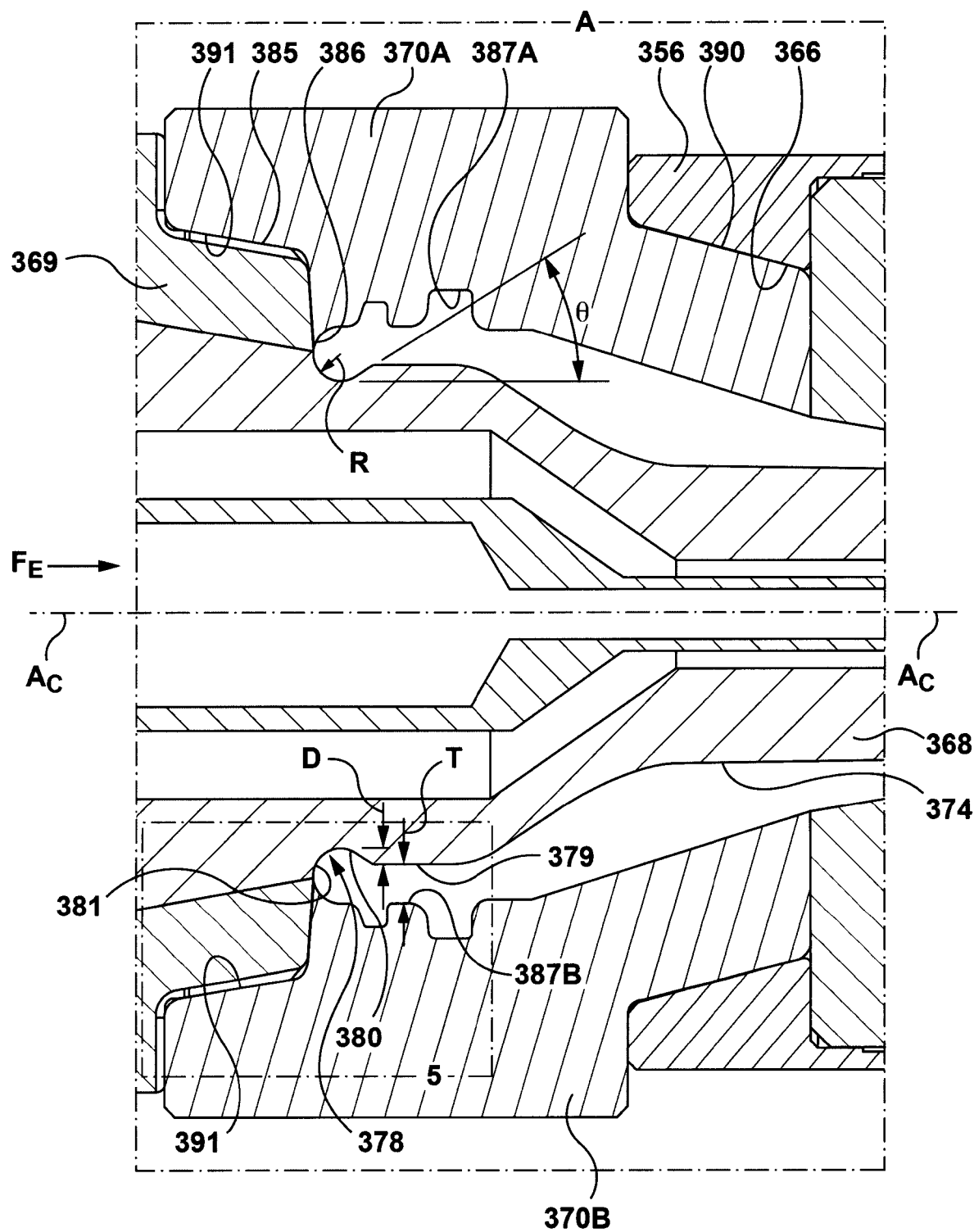
FIG. 3A is an enlarged view of the portion A of FIG. 3.

Referring now to FIG. 3 and FIG. 3A, in which FIG. 3 is a view of mold stack assembly 106 removed from preform molding system 100 and sectioned in a plane that is perpendicular to that shown in FIG. 1B, and FIG. 3A is an enlarged view of a portion A of FIG. 3. Cavity portion 112 includes a gate insert 354, a cavity insert 355 and an alignment ring 356. Gate insert 354 and cavity insert 355 are generally cylindrical and, as shown in FIG. 1B, are located in series within a bore 157 extending through cavity plate 114. A molding surface 358 of cavity insert 355 defines the external shape of preform body portion 244, and a molding surface 360 of gate insert 354 defines the external shape of preform closed end 240. As used herein with reference to molding surfaces of mold stack assembly 106, and to the features of preform 209 shaped thereby, the term 'cylindrical' is approximate, since a person of ordinary skill in the art would understand that an amount of so-called draft may be necessary in order to remove preform 209 from preform molding system 100.

To maintain gate insert 354 and cavity insert 355 at a suitable molding temperature, gate insert 354 and cavity insert 355 include respective gate and cavity insert cooling passageways 362, 363 that are in fluid communication with a respective supply/return cooling channel 164 in cavity plate 114.

Alignment ring 356 is secured to a downstream face of cavity plate 114 by fasteners (shown in FIG. 1) such as socket head cap screws, and includes a shouldered bore 365 in an upstream end thereof sized to engage cavity insert 355. The depth of shouldered bore 365 and the thickness of cavity plate 114 are sized so as to sandwich gate insert 354 and cavity insert 355 between alignment ring 356 and manifold plate 115, which secures cavity insert 355 and gate insert 354 within preform molding system 100. As shown in FIG. 1B, a downstream end of alignment ring 356 includes an internal tapered surface 366 for concentrically aligning cavity portion 112 and core portion 110 when preform molding system 100 is in the mold closed configuration.

Core portion 110 of mold stack assembly 106 generally includes a core insert 368, a stripper ring 369, and a pair of neck rings 370A, 370B. Core insert 368 is generally cylindrical and includes a locating portion 372 and a molding portion 374. Locating portion 372 includes a base 375 by which core insert 368 is coupled to core clamp plate 122, and which aligns and supports core insert 368 relative to core clamp plate 122. Core insert 368 further includes an external tapered surface 376 that mates with an internal tapered surface 377 on stripper ring 369 and whereby stripper ring 369 and core insert 368 are concentrically aligned. Base 375 and external tapered surface 376 are spaced apart or separated by an intermediate section. Molding portion 374 defines the internal shape of preform 209. Specifically, molding portion 374 defines the internal shape of closed end 240 and the internal shape of body and taper, portions 244, 248 of preform 209. Molding portion 374 further includes a calibration portion 379 which is generally cylindrical and defines the internal shape of finish portion 246. In accordance with embodiments hereof molding portion 374 of core insert 368 further includes, an undercut 378 that defines the shape of protrusion 250 on preform 209. As shown in FIG. 3A, undercut 378 is provided in the form of an groove that extends circumferentially around molding portion 374. Undercut 378 includes an inward portion 380 and an outward portion 381 that respectively define the shape of preform concave and convex portions 251, 252. In the current embodiment, undercut 378 is positioned at the downstream end of core insert molding portion 374 and slopes towards a central axis of the mold stack assembly from a cylindrical section of core insert molding portion 374, which as shown in FIG. 3A is calibration portion 379.

Continuing with FIG. 3, core insert 368 further includes a cooling passageway 382 in fluid communication with a respective supply/return channel 184 in core clamp plate 122. In operation, a cooling fluid is circulated through cooling passageway 382 so as to maintain core insert 368 at a suitable molding temperature.

Stripper ring 369 is coupled to stripper plate 124 and is configured to move therewith when stripper plate 124 is actuated, for example by the injection molding machine, or by an auxiliary ejection device. Stripper ring 369 is generally a hollow cylindrical shaped body and, as shown in FIG. 1B, includes a flange at its distal end by which stripper ring 369 is sandwiched between wear plate 136 and stripper plate 124. Stripper ring 369 includes internal tapered surface 377 by which stripper ring 369 is concentrically aligned with core insert 368 and also includes an external tapered surface 385 by which stripper ring 369 is concentrically aligned with neck rings 370A, 370B. Referring to FIG. 3A, stripper ring 369 further includes a molding surface 386 that defines a portion of the shape of finish portion 246 at open end 242 of preform 209, and through which ejection force $F_E$ is delivered to strip or remove preform 209 from core insert 368. In the current embodiment, the remainder of preform open end 242 is defined by core insert 368, and by neck rings 370A, 370B.

Neck rings 370A, 370B, include respective molding surfaces 387A, 387B, which cooperate to define the external shape of preform neck portion 245, and also include a cooling passageway (not shown) in fluid communication with a respective supply/return channel 188 in lateral slides 125A, 125B, as shown in FIG. 1B. For example, each neck ring 370A, 370B may be provided with a cooling passage similar to that disclosed in U.S. Pat. No. 5,599,567 which is incorporated by reference herein in its entirety. In operation, a cooling fluid is circulated through cooling passageway so as to maintain neck rings 370A, 370B at a suitable molding temperature.

Continuing with FIG. 3A and also referring to FIG. 1 and FIG. 2, neck rings 370A, 370B are of the cavity-lock variety having an external tapered surface 390 at an upstream end thereof that engages with internal tapered surface 366 on alignment ring 356, and also having an internal tapered surface 391 at a downstream end thereof that engages with an external tapered surface 385 on stripper ring 369. Engagement between tapered surfaces 391, 385 align neck rings 370A, 370B relative to stripper ring 369, and engagement between tapered surfaces 390, 366 align neck rings 370A, 370B with cavity portion 112. In addition, engagement between tapered surfaces 390, 366 maintains neck rings 370A, 370B in the closed configuration along a neck ring parting line (not shown) when molding material is injected into mold cavity 108. Accordingly, when preform molding system 100 is in a mold closed configuration, core and cavity portions 110, 112 of mold stack assembly 106 are aligned along central axis $A_C$. The cavity-lock configuration of neck rings 370A, 370B permits lateral displacement thereof, i.e. sideways or transverse displacement relative to central axis $A_C$, prior to stripper plate 124 being actuated. In other words, neck rings 370A, 370B are separated from finish portion 246 of a newly molded preform 209 such that preform 209 is stripped from core insert 368 by delivering ejection force $F_E$ to preform top sealing surface 249 with stripper ring 369 when stripper plate 124 is actuated. Neck rings 370A, 370B are coupled to respective lateral slides 125A, 125B, which, as discussed above, are configured to be moved laterally or outward as preform molding system 100 is opened and cam followers 132A, 132B follow the pathway defined by respective cam tracks 120A, 120B. As preform molding system 100 is opened inactive portion 133 of cam track 120A, 120B allows neck rings 370A, 370B to remain together while preform 209 is initially pulled or extracted from cavity insert 355, which allows mold opening force to be transferred to preform 209 internal and external surfaces 238, 239 by way of both core insert 368 and neck rings 370A, 370B. As cam followers 132A, 132B follow the pathway defined by active portion 134 of cam tracks 120A, 120B, the outward movement of lateral slides 125A, 125B separates neck rings 370A, 370B which retracts molding surfaces 387A, 387B away from a newly molded preform 209 prior to stripping preform from core insert 368. A part removal sequence as such creates a space or gap between molding surfaces 387A, 387B and finish portion 246 of a newly molded preform 209 which accommodates the outward flaring or radial expansion of open end 242 of preform 209 that occurs as a result of protrusion 250 clearing undercut 378 as preform 209 is stripped from core insert 368.

The cam plate 118 and cam follower 132A, 132B configuration for opening neck rings 370A, 370B disclosed above is shown by way of example and not limitation. In an alternative embodiment (not shown) neck rings 370A, 370B can remain together until the preform molding system is fully opened, at which point lateral slides are displaced laterally or separated by a linear actuator or actuator(s) to separate molding surfaces 387A, 387B and a newly molded preform 209 prior to actuating stripper plate. An example of such a configuration is shown in U.S. Pat. No. 7,540,740 which is incorporated by reference in its entirety herein.

Continuing with FIGS. 2 and 3A, as mentioned above, core insert 368 is provided with an undercut 378 that forms protrusion 250 on internal surface 238 of preform neck portion 245. Undercut 378 is a groove or recess that extends circumferentially around core insert 368 that extends a depth D into core insert 368 from calibration portion 379.

Figure 5:
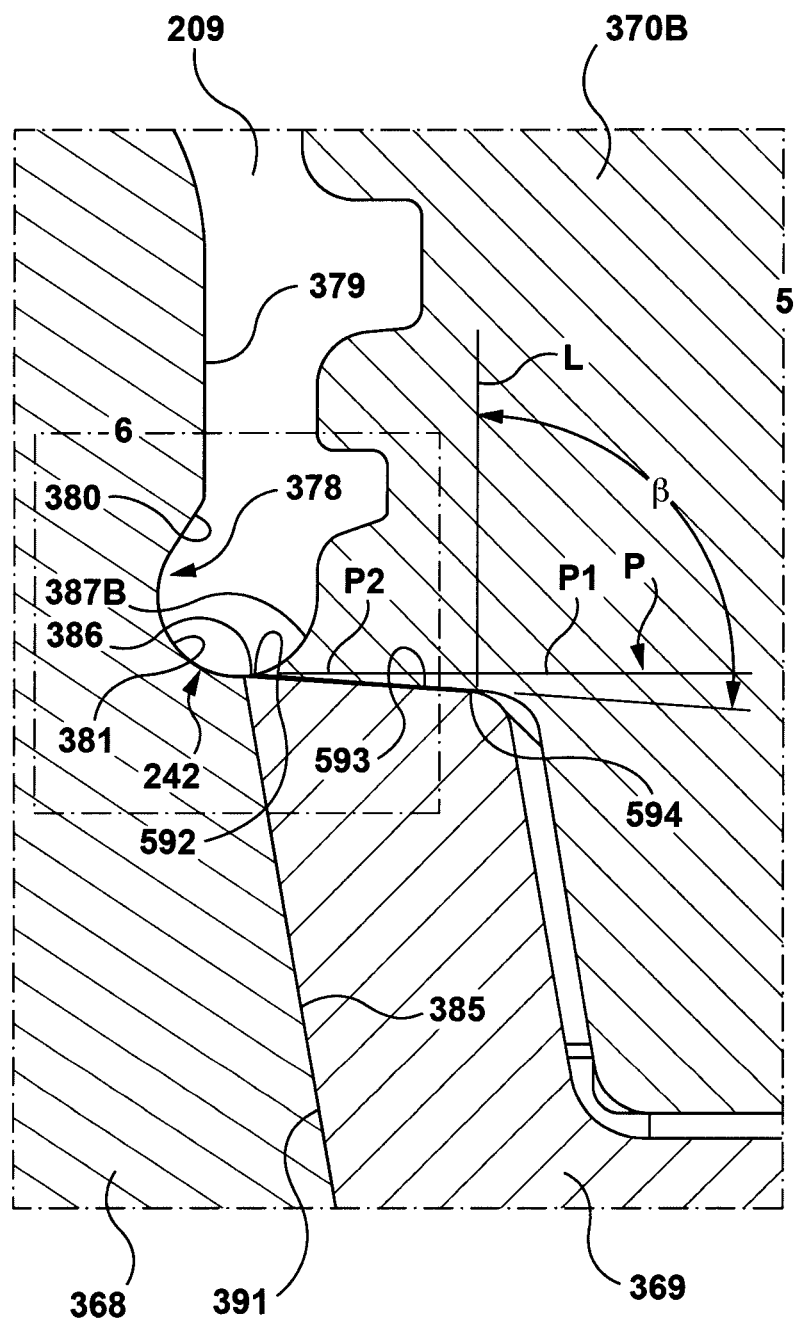
FIG. 5 is an enlarged view of the portion 5 of FIG. 3A.

As shown in FIG. 3A, undercut 378 includes inward portion 380 that slopes towards central axis $A_C$ and outward portion 381 that slopes away from central axis $A_C$. Together, inward and outward portions 380, 381 define the shape of protrusion 250 at the open end 242 of preform 209. In the current embodiment inward portion 380 is a generally tapered or conical shaped surface that extends in the downstream direction towards central axis $A_C$ at an angle θ and outward portion 381 is a generally curved or flared surface to which inward portion 380 is tangent. Outward portion 381 has a generally arcuate cross-sectional shape that extends between inward portion 380 and molding surface 386 of stripper ring 369. As shown in FIG. 3A, the cross-sectional shape of outward portion 381 has a constant radius R. However, in another embodiment the radius of the cross-sectional shape of outward portion is variable or changes between inward portion 380 and molding surface 386. Together, inward and outward portions 380, 381 have a cross sectional shape that can be described as having a half tear-drop shaped profile, as can be seen in FIG. 5. In an alternative embodiment (not shown), outward portion 381 is a generally tapered or conical shaped surface that extends away from central axis $A_C$ at an angle.

The characteristics of inward portion 380 facilitate removal of preform 209 from core insert 368 when stripper ring 369 is advanced forward to strip or remove preform 209 from preform molding system.

The taper angle θ of inward portion 380 is selected to cause preform finish portion 246 to radially expand during the ejection phase of the molding cycle. That is, as stripper plate 124 is actuated to eject preform 209, stripper ring 369 bears upon preform top sealing surface 249 which causes protrusion concave portion 251 of preform 209 to interact with undercut inward portion 380 on mold core 368. More specifically, concave portion 251 presses against inward portion 380 such that displacement of preform 209 in the axial direction, as shown by arrow A in FIG. 2, causes open end 242 of preform 209 to expand radially or flare open as shown by double ended arrow E in FIG. 2. In other words, concave portion 251 of preform 209 and inward portion 380 of undercut 378 are configured as co-acting inclined or sloped surfaces that are conducive to translating an amount of motion in a first direction, i.e. the direction of stripper plate actuation, and to a lesser amount of motion in a direction perpendicular to the first direction, i.e. in a direction which causes open end 242 of preform to flare open or expand. In an embodiment taper angle θ of inward portion 380 is constant, and is selected to be within the range of about 5° to about 40° relative to central axis $A_C$. In another embodiment taper angle θ of inward portion 380 is selected to be within the range of about 30° to about 40° relative to central axis $A_C$. In yet another embodiment angle θ of inward portion 380 is within the range of about 32° to about 35° relative to central axis $A_C$. As shown in FIG. 3A (and also in FIG. 5), inward portion 380 is configured to a have a generally constant linear, tapered or conical cross-sectional, such that when preform 209 is removed from mold core, the rate at which the circumference of preform open end 242 expands is generally constant. In an alternative embodiment, (not shown) inward portion 380 can include a plurality of inward sections, the taper angles of each increases in the upstream direction. That is, the taper angle of an inward section that closer to outward portion 381 is smaller than the taper angle of an inward section that is further away from outward portion 381. The resulting being, when preform 209 is removed from mold core, the rate at which the circumference of preform open end 242 expands gradually increases. In another alternative embodiment (not shown), instead of being generally linear, the cross-sectional shape of inward portion 380 can be arcuate, for example either concaved towards or convexed away from central axis AC, with lines that are tangent to the arcuate inward portion 380 still being within the angular ranges described above.

The depth D of undercut 378 as measured from calibration portion 379 is selected according to the wall thickness T of preform 209 adjacent to undercut 378 so as to permit open end 242 of preform to flare open during ejection. In an embodiment the ratio of wall thickness T to depth D of undercut 378 is within the range of about 2:1 to about 6:1. This range allows finish portion 246 of preform 209 to deflect, or flare open, when concave and inward portions 251, 380 interact as described above, without becoming unacceptably distorted or flared open, and in some cases still allowing preform 209 to return to, or close to, it's as molded shape after it is stripped from core insert 368. In the current embodiment the ratio of wall thickness T to depth D is about 3:1.

When stripper ring 369 is actuated to eject preform 209, finish portion 246 expands radially, which causes top sealing surface 249 to expand radially across molding surface 386 of stripper ring 369. Outward portion 381 together with neck ring molding surface 387A, 387B create a demi-toroidal shaped preform open end 242 having a generally circular cross-sectional shape. This arrangement creates a preform 209 having a relatively small annular shaped top sealing surface 249 vertex proximate the interface between stripper ring 369 mold core 368. In some applications this type of contact between open end 242 and stripper ring 369 may reduce the friction therebetween as open end 242 flares open against stripper ring 369 during the ejection phase of the molding cycle.

The curved surface of outward portion 381 creates a circumferential line contact area (shown in FIG. 4CC) between protrusion 250 and the portion of molding portion 374 that defines the internal shape of preform finish portion 246, which in some applications limits the friction between protrusion 250 and molding portion 374 as preform is stripped from core insert 368.

Although shown as curved surfaces in FIG. 3A, in an alternative embodiment (not shown) outward portion 381 and the downstream portion of neck ring molding surface 387A, 387B are intersecting conical surfaces that define the shape of preform open end 242, and the contact area between top sealing surface 249 and stripper ring is defined by the vertex of conical shaped outward portion 381 and neck ring molding surfaces 387A, 387B.

An operational sequence of preform molding system 100 will now be described with reference to FIG. 4A to FIG. 4E.

Figure 4A:
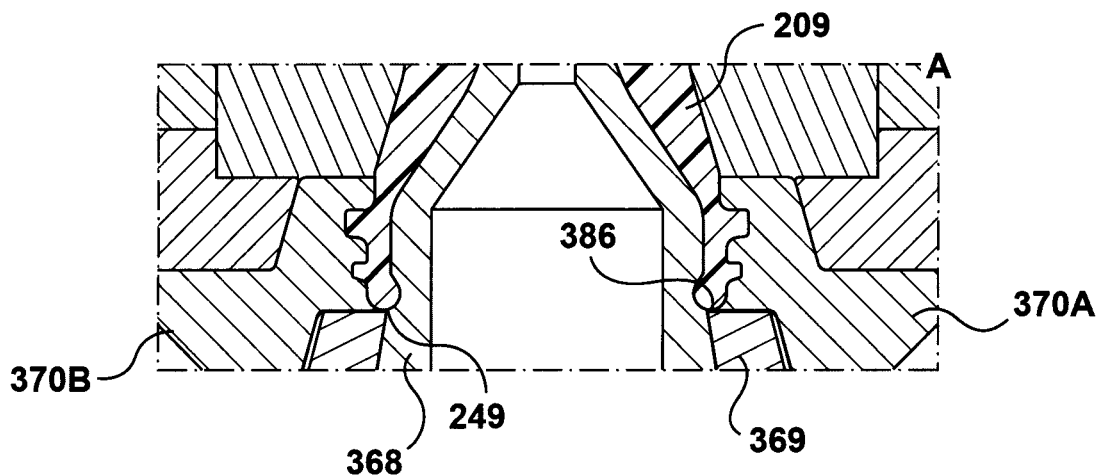

FIG. 4A depicts a portion of preform molding system 100 at a first stage in the operational sequence thereof, and FIG. 4AA depicts an enlarged view of a portion A of FIG. 4A. Core half 104 and cavity half 101 are held together in the mold closed configuration, and the injection molding machine injects moldable material, for example molten polyethylene terephthalate (PET), into mold cavity 108 to create a preform 209 therein. Preform molding system 100 is maintained in mold closed configuration until the newly injected molding material has solidified to the point where preform 209 can withstand further handling without being damaged.

FIG. 4B depicts preform molding system 100 at a second stage in the operational sequence thereof. The newly injected molding material has sufficiently solidified in mold cavity 108, and core half 104 has been separated from cavity half 101 such that preform molding system is in the mold open configuration so as to facilitate ejection of preform 209. Since cam plate 118 (not shown in FIG. 4B) and cam tracks 120A, 120B defined thereby are coupled to cavity half 101, the linear movement associated with translating preform molding system 100 from the mold closed configuration to the mold open configuration causes lateral slides 125A, 125B to move away from core insert 368 and retract neck rings 370A, 370B from a newly molded preform 209.

Figure 4C:
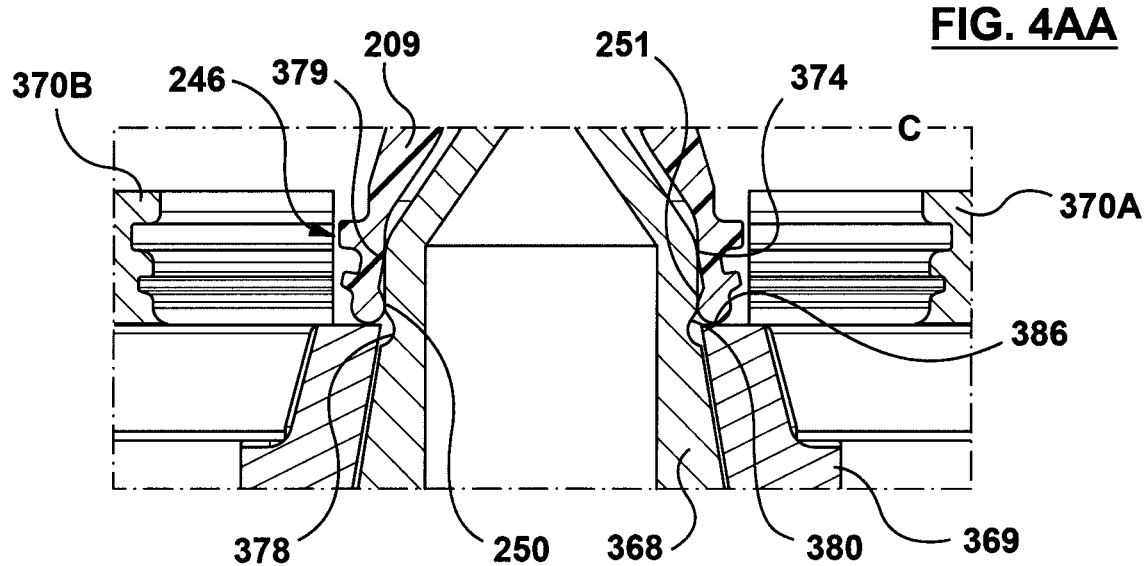

FIG. 4C depicts preform molding system 100 at a third stage in the operational sequence thereof, and FIG. 4CC depicts an enlarged view of a portion C of FIG. 4C. Stripper plate 124, having stripper ring 369 coupled thereto, has commenced axially displacing preform 209 from core insert 368 to cause open end 242 of preform 209 to expand around calibration portion 279 of core insert 368. More specifically, as shown more clearly in FIG. 4CC, actuation of stripper ring 369 pushes on preform 209 and has caused the sloped surfaces of preform concave portion 251 and undercut inward portion 380 to co-act and radially expand or circumferentially enlarge preform open end 242 around calibration portion 279 to release internal protrusion 250 from undercut 378. At this stage, preform finish portion 246 is flared open, and is under tension as protrusion 250 bears radially inward upon calibration portion 279. As stripper ring 369 is advanced forward, preform open end 242 is maintained in an expanded state inward pressure against calibration portion is maintained until protrusion 250 clears calibration portion. If the as molded open end 242 of preform 209 has an unacceptable oval cross sectional shape, for example due to uneven melt homogenization or uneven part wall thickness, inward pressure of protrusion 250 against cylindrical shaped calibration portion 279 will encourage the oval shaped open end 242 to conform to the circular cross sectional shape of calibration portion 279 as protrusion 250 is pushed along the length of calibration portion 209. To prevent unwanted vacuum pressure from building inside preform 209 during ejection while protrusion 250 is in contact with calibration portion 379 molding portion 374 can be textured, for example by draw finishing calibration portion 379.

Figure 4D:
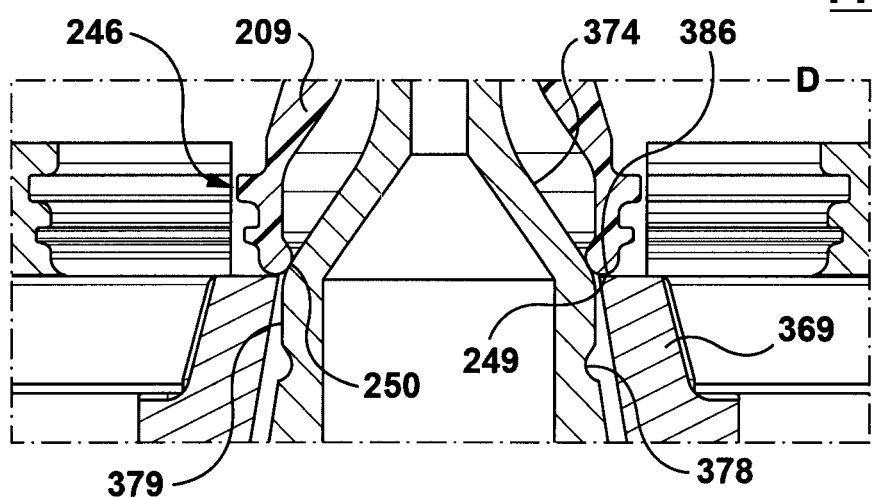

FIG. 4D depicts preform molding system 100 at a fourth stage in the operational sequence thereof and FIG. 4DD is an enlarged view of a portion D of FIG. 4D. Stripper ring 369 has further stripped or ejected preform 209 from core insert 368. As shown more clearly in FIG. 4DD, once stripper ring 369 has pushed preform 209 to the point where internal protrusion 250 has past calibration portion 379, the tension or outward pressure on preform finish portion 246 is released and the elasticity of the molding material causes preform finish portion 246 to return to a relaxed state.

FIG. 4E depicts preform molding system 100 at a fifth stage in the operational sequence thereof. Stripper ring 369 has been actuated to a maximum stroke length. The inertia created by the forward movement of stripper ring 369 causes preform 209 to continue moving in the direction of arrow A to fully clear core insert 368 at which point preform 209 is ejected or stripped from core insert 368. At this stage, preform 209 falls from between the mold halves onto a conveyor (not shown) and is transferred away from the injection molding machine. Alternatively, as preform 209 is stripped from core insert 368 it is received by a take-out plate (not shown) of a post-mold cooling system (not shown) to be cooled outside of the molding machine as is known in the art of preform molding. With preform 209 having been ejected from preform molding system 100 core half 104 and cavity half 101 can be urged together, as depicted in FIG. 3A, and the operational sequence can begin again.

Turning now to FIG. 5 which is an enlarged view of the portion 5 of FIG. 3A showing the mating engagement between core insert 368, neck ring 370B, and stripper ring 369 when preform molding system 100 is the mold closed position and defines the shape of open end 242 of perform 209. As discussed above, undercut 378 includes inward and outward portions 380, 381, the half tear-drop cross-sectional shape of which is visible in FIG. 5. Also shown in FIG. 5, inward portion 380 has a generally linear cross-sectional shape that is tangent to the arcuate cross-sectional shape of outward portion 381. The downstream end of molding surface 387B of neck ring 370B is sloped or curved towards molding surface 386 of stripper ring 369 to form a generally acute angle with a face contact surface 593 of stripper ring 369. As shown in FIG. 5, the terminal end of neck ring molding surface 387B ends at a terminal edge 592 which forms the apex of the acute angle between the downstream end of neck ring molding surface 387B and stripper ring face contact surface 593. Face contact surfaces 593, 594 are outwardly tapered or sloped in the downstream direction to form an obtuse angle β relative to central axis, which is not shown in FIG. 5; however, for ease of understanding, an angular reference line L, which is parallel to central axis is shown instead. As neck ring 370B is translated toward, and away from, core insert 368, edge 592 follows a linear horizontal (as shown in page view) pathway as shown by reference line P. When neck ring 370B is translated away from core insert 368, the horizontal pathway of edge 592 in combination with the obtuse angle β of face contact surfaces 593, 594 results in the distance between edge 592 and face contacting surface 593 becoming gradually larger. Conversely, as neck ring 370B is translated towards core insert 368, the horizontal pathway of edge 592 in combination with the obtuse angle β of face contact surfaces 593, 594 results in the distance between edge 592 and face contacting surface 593 becoming gradually smaller. In other words, when neck ring 370B is relatively further away from core insert, for example, as shown at position P1, the distance between edge 592 and face contact surface 593 is relatively greater than when neck ring 370B is relatively closer to core insert 368, for example, as shown at position P2. This arrangement ensures that as neck ring 370B is translated to its closed position, edge 592 is spaced apart from face contacting surface 593 until just prior to internal tapered surface 391 of neck ring 370B makes contact with external tapered surface 385 of stripper ring 369, which in some instances may increase the service life of neck ring 370B by reducing frictional wear of edge 592. Although the above description made with regard to neck ring 370B alone, it should be understood that the obtuse angle β neck ring and stripper ring face contact surface arrangement applies to both neck rings 370A, 370B. In an embodiment obtuse β angle between face contact surfaces 593, 594 and central axis is selected to be within the range of about 91° to about 100°. In another embodiment obtuse angle β between face contact surfaces 593, 594 and central axis is selected to be within the range of about 93° to about 97°. In still another embodiment obtuse angle β between face contact surfaces 593, 594 and central axis is 95°.

Figure 6A:
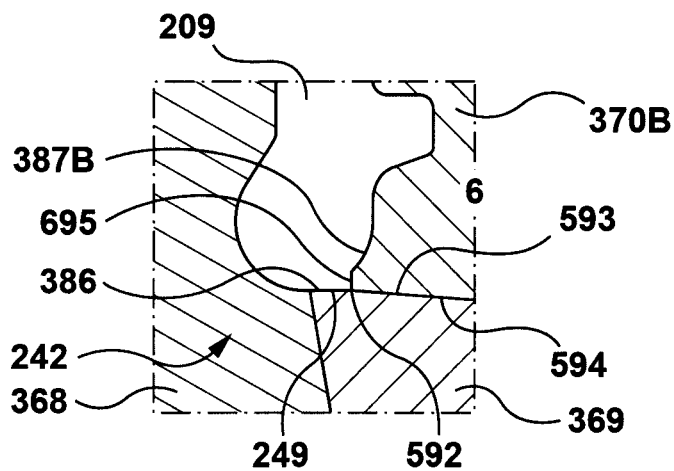
FIG. 6A is an enlarged view of the portion 6 of FIG. 5 in accordance with an embodiment hereof.

FIG. 6A is an enlarged view of the portion 6 of FIG. 5 showing the mating engagement between core insert 368, neck ring 370B, and stripper ring 369 when preform molding system 100 is the mold closed position and defines the shape of open end 242 of perform 209 in accordance with an embodiment hereof. Features and aspects of the current embodiment can be used accordingly with the other embodiments. Similar to the embodiment of FIG. 5, the downstream end of neck ring molding surface 387B slopes inward towards molding surface 386 of stripper ring 369; however, in the current embodiment neck ring molding surface 387B has been truncated, as shown at truncated surface 695, such that edge 592 is located further away from core insert 368 than in the embodiment shown in FIG. 5. By moving edge 592 away from core insert 368, the surface area of stripper ring molding surface 386 has been increased, which likewise increases the size of preform top sealing surface 249. Accordingly, as preform 209 is removed from core insert 368 ejection force is distributed over a larger area at preform open end 242, which in some applications may assist in removing preform 209 from core insert 363, and in some applications truncated surface 695 may increase the service life of neck rings 370A, 370B. Similar to the embodiment of FIG. 5, stripper ring 369 and neck ring 370B mate at respective face contact surfaces 593, 594, which are outwardly tapered in the downstream direction to form an obtuse angle β relative to central axis tapered such edge 592 is spaced apart from stripper ring face contact surface 593 until just prior to neck ring 370B and neck ring 370A (not shown) are brought together in engaging contact.

Figure 6B:
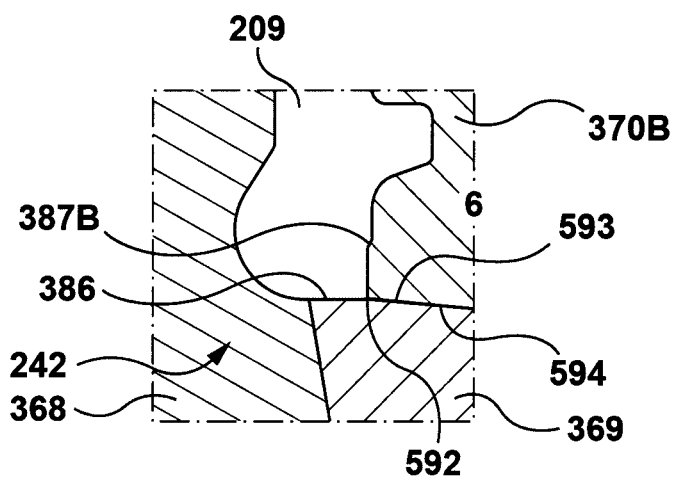
FIG. 6B is an enlarged view of the portion 6 of FIG. 5 in accordance with an embodiment hereof.

FIG. 6B is an enlarged view of the portion 6 of FIG. 5 showing the mating engagement between core insert 368, neck ring 370B, and stripper ring 369 when preform molding system 100 is the mold closed position and defines the shape of open end 242 of perform 209 in accordance with an embodiment hereof. Features and aspects of the current embodiment can be used accordingly with the other embodiments. Unlike the previous embodiments, rather than being inclined inward towards stripper ring molding surface 386, the downstream end of neck ring molding surface 387B extends at a constant angle towards stripper ring molding surface 386 to end at edge 592. In the current embodiment, the angle of downstream end of neck ring molding surface 387B relative to stripper ring molding surface 386 is selected so as to create a 90° angle with edge 592 forming the apex therebetween. In the current embodiment edge 592 is located further away from core insert 368 than in the embodiment shown in FIGS. 5 and 6A, which increases the surface area of stripper ring molding surface 386 and the size of preform top sealing surface 249. Accordingly, as stripper ring is actuated to remove preform 209 core insert 368 ejection force is distributed over a larger area at preform open end 242 which, in some applications may assist in ejecting preform 209. Similar to the previous embodiments, stripper ring 369 and neck ring 370B mate at respective face contact surfaces 593, 594, which are tapered to form an obtuse angle relative to central axis.

Figure 6C:
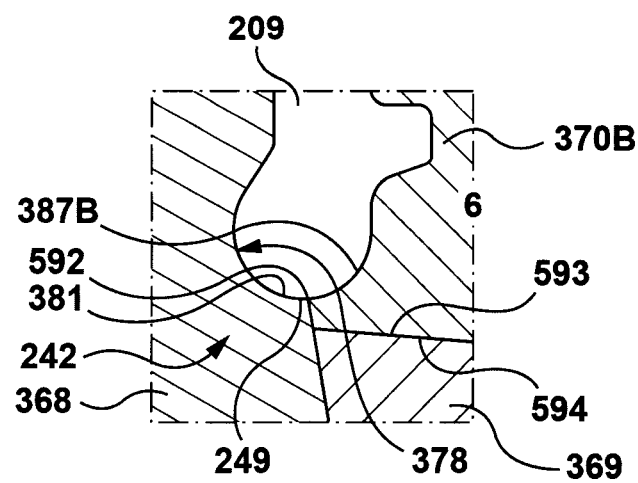
FIG. 6C is an enlarged view of the portion 6 of FIG. 5 in accordance with an embodiment hereof.

FIG. 6C is an enlarged view of the portion 6 of FIG. 5 showing the mating engagement between core insert 368, neck ring 370B, and stripper ring 369 when preform molding system 100 is the mold closed position and defines the shape of open end 242 of perform 209 in accordance with an embodiment hereof. Features and aspects of the current embodiment can be used accordingly with the other embodiments. In the current embodiment stripper ring 369 and neck ring 370B face contacting surfaces 593, 594 are spaced apart from the mold cavity 108. Downstream end neck ring molding surface 387B curves inward such that edge 595 is adjacent to the downstream end of outward portion 381 of undercut 378 so as to define the shape of top sealing surface 249 therebetween. In this arrangement, when neck rings 370A (not shown), 370B are retracted from perform 209, there is a gap between the open end 242 of perform 209 and face surface 593 of stripper ring 369. With neck rings 370A (not shown), 370B retracted, the gap is closed as stripper ring 369 is actuated into contact open end 249 of with perform 209.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein can be used in combination with the features of any other embodiment. All patents and publications discussed herein are incorporated by reference herein in their entirety.

What is claimed is:

1. A preform molding system having a cavity half mountable to a stationary platen of an injection molding machine, and a core half mountable to a moving platen of the injection molding machine, the preform molding system comprising:
   a mold stack assembly having a cavity portion and a core portion,
   the cavity portion coupled to the cavity half and including a cavity insert, and
   the core portion coupled to the core half and including a core insert, a pair of neck rings, and a stripper ring, the core insert having an undercut that defines an annular protrusion on an internal surface of a preform created in the mold stack assembly, wherein
   the undercut includes an inward portion that slopes towards a central axis of the mold stack assembly, and an outward portion that slopes away from the central axis,
   the outward portion is a curved surface to which the inward portion is tangent, and
   the outward portion has an arcuate cross-sectional shape that extends between the inward portion and a molding surface of the stripper ring; and
   wherein the preform molding system is configured to permit in sequence retraction of the pair of neck rings away from the core insert, and ejection of the preform from the core insert via the stripper ring.

2. The preform molding system according to claim 1, wherein the stripper ring includes an internal tapered surface by which the stripper ring is concentrically aligned with the core insert.

3. The preform molding system according to claim 2, wherein the stripper ring includes an external tapered surface by which the stripper ring is concentrically aligned with the pair of neck rings.

4. The preform molding system according to claim 1, wherein the pair of neck rings have an external tapered surface at an upstream end thereof that engages with an internal tapered surface on an alignment ring at a downstream end of the cavity insert.

5. The preform molding system according to claim 1, wherein the stripper ring further includes a molding surface through which ejection force is delivered to strip or remove the preform from the core insert.

6. The preform molding system according to claim 1, wherein the inward portion slopes towards the central axis of the mold stack assembly from a calibration portion section of the core insert.

7. The preform molding system according to claim 1, wherein the inward portion is a conical shaped surface of the core insert that extends in a downstream direction towards the central axis at a constant taper angle.

8. The preform molding system according to claim 7, wherein the taper angle is within a range of about 5° to about 40° relative to the central axis.

9. The preform molding system according to claim 8, wherein the taper angle is within the range of about 30° to about 35° relative to the central axis.

10. The preform molding system according to claim 1, wherein the inward portion includes a plurality of inward sections.

11. The preform molding system according to claim 1, wherein the cross-sectional shape of the outward portion has a constant radius.

12. The preform molding system according to claim 1, wherein a downstream end of a molding surface of each of the pair of neck rings curves inward towards a molding surface of the stripper ring.

13. The preform molding system according to claim 12, wherein the inwardly curved molding surface of each of the pair of neck rings ends at an edge.

14. The preform molding system according to claim 1, wherein a downstream end of a molding surface of each of the pair of neck rings extends at a constant angle towards a molding surface of the stripper ring.

15. The preform molding system according to claim 1, wherein the stripper ring and the pair of neck rings mate at respective contact surfaces of the stripper ring and the pair of neck rings which are outwardly tapered in a downstream direction so as to form an obtuse angle relative to a central axis of the mold stack assembly.

16. The preform molding system according to claim 15, wherein the obtuse angle is within a range of about 91° to about 100°.

17. The preform molding system according to claim 15, wherein the obtuse angle is 95°.

* * * * *